United States Patent
Yang

(10) Patent No.: US 8,358,196 B2
(45) Date of Patent: Jan. 22, 2013

(54) SECURITY SYSTEM AND METHOD FOR GRANTING ACCESS

(75) Inventor: Song-Ling Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 454 days.

(21) Appl. No.: 12/613,535

(22) Filed: Nov. 6, 2009

(65) Prior Publication Data

US 2010/0277272 A1 Nov. 4, 2010

(30) Foreign Application Priority Data

Apr. 30, 2009 (CN) .......................... 2009 1 0302040

(51) Int. Cl.
*G05B 23/00* (2006.01)
(52) U.S. Cl. ...... 340/5.55; 340/5.2; 340/5.51; 340/5.81; 340/5.85; 340/5.54
(58) Field of Classification Search ................... 340/5.2, 340/5.51, 5.55, 5.54, 5.8, 5.81, 5.85
See application file for complete search history.

(56) References Cited

U.S. PATENT DOCUMENTS

| | | | | |
|---|---|---|---|---|
| 3,867,823 A | * | 2/1975 | Waltower | 70/456 B |
| 3,893,073 A | * | 7/1975 | Angello | 340/5.54 |
| 4,679,419 A | * | 7/1987 | Scelba | 70/312 |
| 5,963,215 A | * | 10/1999 | Rosenzweig | 345/649 |
| 8,130,075 B1 | * | 3/2012 | Hingole | 340/5.55 |
| 2010/0042954 A1 | * | 2/2010 | Rosenblatt et al. | 715/863 |

* cited by examiner

*Primary Examiner* — Albert Wong
*Assistant Examiner* — Peter Mehravar
(74) *Attorney, Agent, or Firm* — Altis Law Group, Inc.

(57) ABSTRACT

A method for granting access with a touch sensitive display is provided. The method includes displaying a security access interface on a touch sensitive display, wherein the security access interface has at least one polyhedron object; changing the at least one polyhedron object from a first state to a second state according to detections of inputs/contacts with the touch sensitive display; recording parameters of the at least one polyhedron object in the second state; determining if the recorded parameters satisfy the predetermined values; granting access when the record parameters satisfy the predetermined values. A security system using the method is also provided.

2 Claims, 4 Drawing Sheets

SECURITY SYSTEM AND METHOD FOR GRANTING ACCESS

BACKGROUND

1. Technical Field

The present disclosure relates to security systems, and more particularly to a security system and a method for computerized access.

2. Description of Related Art

The conventional password often includes numerical information and/or letters, such as, the number 0-9, a-z/A-Z. However, input devices used for inputting password information are substantially similar, and locations of the numbers and the letters arranged in the input device are unchangeable. Accordingly, the password information can easily be observed while inputting the password information.

Therefore, it is desired to provide a security system and a method for overcoming the described shortcomings and deficiencies.

BRIEF DESCRIPTION OF THE DRAWINGS

The components of the drawings are not necessarily drawn to scale, the emphasis instead being placed upon clearly illustrating the principles of the embodiments of the security system. Moreover, in the drawings, like reference numerals designate corresponding parts throughout several views.

DETAILED DESCRIPTION

Figure 1:
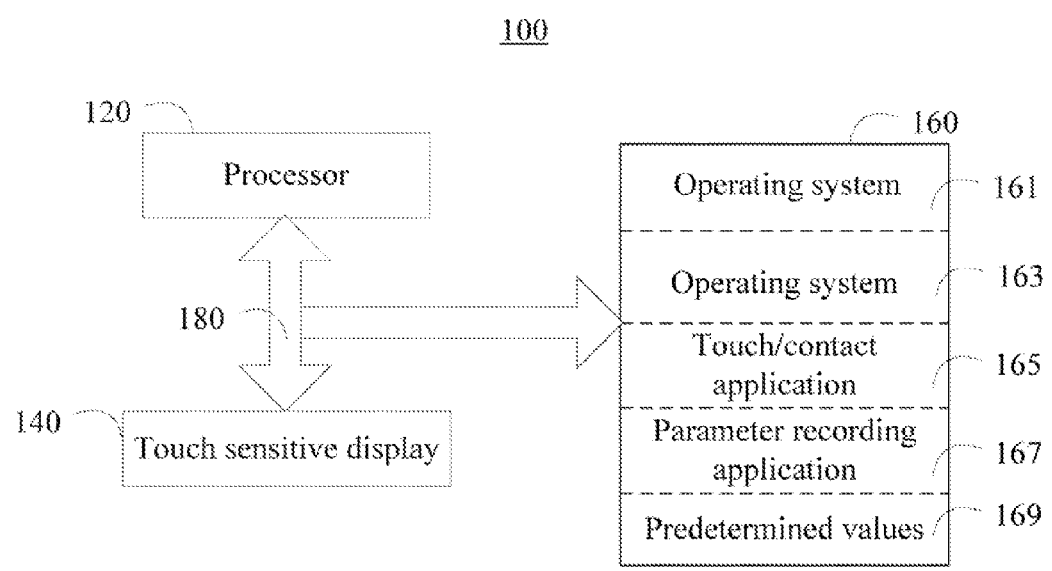
FIG. 1 is a block diagram of a security system in accordance with an exemplary embodiment.

Referring to FIG. 1, a block diagram of a security system 100 in accordance with an exemplary embodiment is shown. The security system 100 generally includes a processor 120, a touch sensitive display 140, and a storage device 160, all interconnected via a bus 180.

The processor 120 executes/runs various software components stored in the storage device 160 to perform various functions for the security system 100, and controls the operations of the security system 100.

The touch sensitive display 140 provides both an output interface and an input interface between the security system 100 and a user. The touch sensitive display 140 is operable to receive inputs/contacts by one or more means, for example, a stylus and/or by touch. The touch sensitive display 140 may receive/detect the inputs/contacts using any of a plurality of touch sensitivity technologies, including but not limited to capacitive, resistive, infrared, and surface acoustic wave technologies. The touch sensitive display 140 is also operable to output graphical data. The visual outputs may include text, graphics, video, and any combination thereof. The touch sensitive display 120 may use liquid crystal display (LCD) technology, or light emitting polymer (LPD) display technology, although other display technologies may be used in other embodiments.

The storage device 160 includes one or more types of memories, such as a read only memory (ROM) and a random access memory (RAM). The storage device 160 may also store an operating system 161, a graphical application 163, a touch/contact application 165, a parameter recording application 167, and a predetermined values 169 used for authenticating an inputted password from the touch sensitive display 140.

The operating system 161 (e.g., LINUX®, UNIX®, WINDOWS®, or an embedded operating system such as VxWorks®) includes various procedures, sets of instructions, software components and/or drivers for controlling and managing general system tasks (e.g., memory management, storage device control, and power management, etc.) and facilitating communication between various hardware and software components.

The graphical application 163 includes various software components and/or set of instructions, which may be implemented by the processor 120 for rendering and displaying graphical user interfaces (GUI) on the touch sensitive display 140. It should be noted that the GUI may include any object that can be displayed, including, text, web pages, icons (such as user interface objects including soft keys), digital images, videos, animations and the like.

Figure 2:
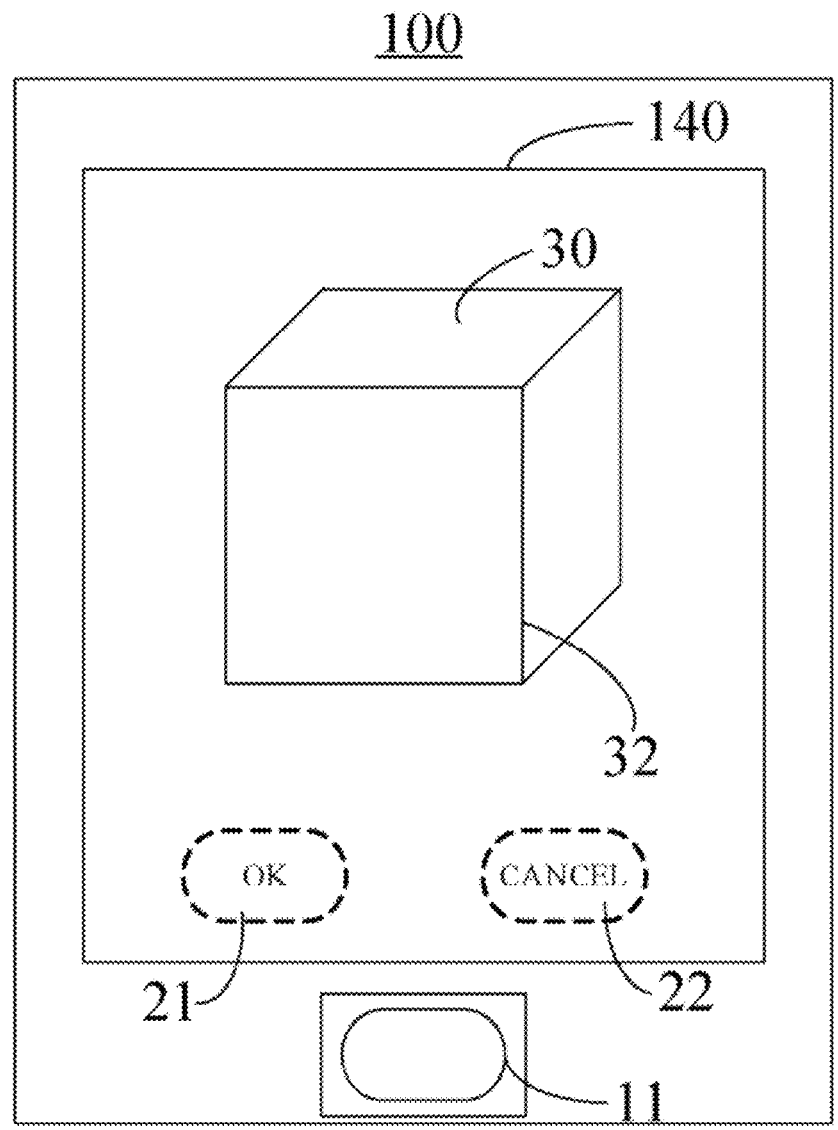
FIG. 2 is a schematic diagram showing a security access interface generated by a security system of FIG. 1 in accordance with a first embodiment.
Figure 3:
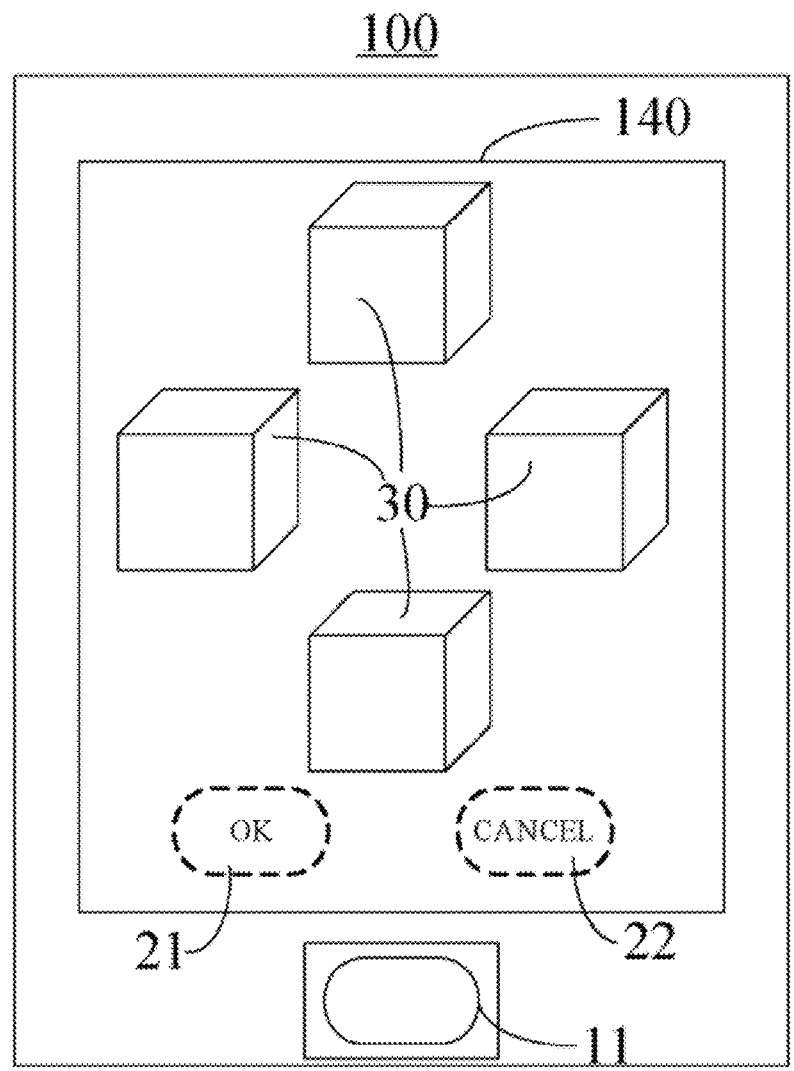
FIG. 3 is a schematic diagram showing another security access interface generated by a security system of FIG. 1 in accordance with a second embodiment.

Referring to FIG. 2, when the security system 100 is triggered to prompt for access/unlock operations (procedures), the graphical application 163 is implemented by the processor 120 to display a security access interface on the touch sensitive display 140. The security access interface includes one or more polyhedron objects 30. Each polyhedron object 30 is rotatable and movable in a virtual three-dimensional space. Each polyhedron object 30 has static parameters, and dynamic parameters (hereinafter, parameters). The static parameters are unchangeable, such as, a color of each polyhedron object 30, numbers of the polyhedron objects 30, and numbers of the faces of each polyhedron object 30. The security access interface can receive user inputs to perform operations on the polyhedron objects 30, thereby, changing the dynamic parameters of polyhedron objects 30. The dynamic parameters may be changed by rotating the object, moving/repositioning the object etc. The dynamic parameters include rotated angles, rotated direction, moved displacement, rearranged sequences of the polyhedron object 30 etc. In a first embodiment, the security access interface includes one polyhedron object 30 which is a hexahedron, and the color of the hexahedron is white. Referring to FIG. 3, in a second embodiment, the security access interface includes four polyhedron objects 30 which are all hexahedrons. The four hexahedrons are arranged orderly in the touch sensitive display 140, the color of the four hexahedrons can be the same or different. Each hexahedron is rotatable and locations of every two hexahedrons are exchangeable.

The touch/contact application 165 includes various software components and/or set of instructions, which may be invoked/implemented by the processor 120 for detecting inputs/contacts with the touch sensitive display 140. More particularly, the touch/contact application 165 may be invoked/implemented for performing various operations related to detections of inputs/contacts with the touch sensitive display 140, such as determining if the inputs/contacts have occurred, and determining if the inputs/contacts have ended (i.e., if the inputs/contacts have stopped). In the embodiment, the touch/contact application 165 may be invoked/implemented for changing the polyhedron object 30 according to detections of inputs/contacts with the touch sensitive display 140.

The parameter recording application 167 includes various software components and/or set of instructions, which may be invoked/implemented by the processor 120 for recording the changed parameters of the polyhedron object 30 according to the touch input/contacts with respect to the touch sensitive display 140. When the parameters of the polyhedron objects 30 are changed, the processor 120 invokes/implements the parameter recording application 167 to record the changed parameters of the polyhedron objects 30, and further grants access if the recorded parameters matches the predetermined values. More detail with respect to recording the parameters of the polyhedron object 30 will be described hereinafter.

Further referring to FIG. 2, in operation, the processor 120 of the security system 100 invokes/implements the graphical application 163 to display a security access interface including a hexahedron 30 in the touch sensitive display 140. The hexahedron 30 is white and has six faces. When the hexahedron is rotated clockwise around a rim 32 thereof by ninety degrees, the parameter recording application 167 is invoked/implemented by the processor 120 to record changes to the parameters of the hexahedron as follow: the color is white, the number of faces is six, the rotated angle is 90 degrees, and the rotated direction is clockwise etc. Then, the processor 120 retrieves the predetermined values 169 from the storage device 160. Furthermore, the processor 120 compares the recorded parameters with the predetermined values 169. When the recorded parameters satisfy/match the predetermined values 169 stored in the storage device 160, the security system 100 is unlocked. Otherwise, the security system 100 remains unlocked. Therefore, by changing the hexahedron 30, the security system 100 is triggered to access/unlock operations (procedures).

The security access interface further includes an affirm button 21 and a cancel button 22. The affirm button 21 is configured to generate affirm signals according to detections of inputs/contacts with the touch sensitive display 140. The cancel button 22 is configured to generate cancel signals according to detections of inputs/contacts with the touch sensitive display 140. After the parameters of the polyhedron objects 30 are changed, the processor 120 recognizes the changing operations of the polyhedron objects 30 as effective operation when receiving an affirm signal. When the processor 120 receives a cancel signal, the changing operations of the polyhedron objects 30 are recognized as ineffective. The security system 100 can also provide a mechanical button 11. The mechanical button 11 generates the affirm signals when being actuated.

Furthermore, the recorded parameters are selectively to be defined as newly predetermined values to replace the predetermined values stored in the storage device 160. Therefore, by changing the hexahedron 30, the security system 100 is triggered to access/unlock operations (procedures).

Figure 4:
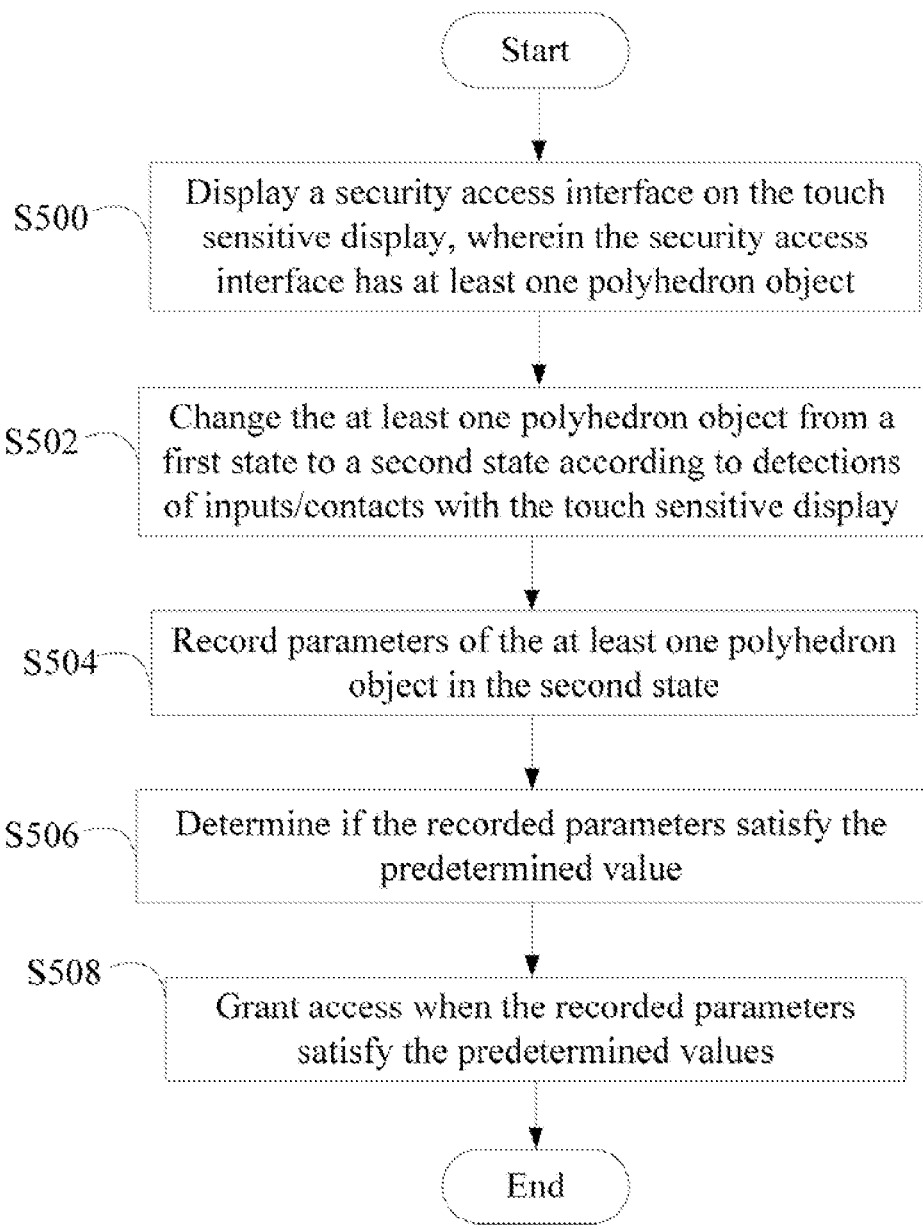
FIG. 4 is a flowchart of a method for granting access in accordance with the embodiment.

Referring to FIG. 4, a flowchart illustrating a method applied on the security system 100 of FIG. 1 for granting access is shown. The method includes the following blocks, each of which is tied to various modules contained in the security system 100 as shown in FIG. 1.

At block S500, in operation, the processor 120 invokes/implements the graphical application 163 to display a security access interface on the touch sensitive display 140. In the first embodiment, the security access interface includes a polyhedron object 30. The polyhedron object 30 is changeable according to detection inputs/contacts with the touch sensitive display 140.

At block S502, the processor 120 of the security system 100 invokes/implements the touch/contact application 165 to receive user's touches/contacts, thereby, changing parameters of the polyhedron object 30 from a first state to a second state based on the user's touches/contacts.

At block S504, the processor 120 invokes/implements the parameter recording application 167 to record the changed parameters of the polyhedron object 30 in the second state.

At block S506, the processor 120 determines if the recorded parameters satisfy/match the predetermined values.

At block S508, the processor 120 triggers the security system 100 to grant access/unlock operations (procedures).

As described above, the user is granted access by changing a polyhedron object 30 included in a security access interface, thereby, protecting the password more efficiently.

It should be noted that the various blocks in the method illustrated in FIG. 4 may be performed in the order presented, or may be performed in a different order. Furthermore, in some embodiments, some blocks can be added to the method, for example, the processor 120 determines the changing operations of the polyhedron objects 30 is effective if the processor 120 receives an affirm signal generated by the affirm button 21 or the mechanical button 11, and if the changing operations of the polyhedron objects 30 is effective, the processor 120 implements the block S506.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A security system, comprising:
   a touch sensitive display;
   a memory storing predetermined values and a plurality of modules; and
   a processor executing the plurality of modules;
   wherein the plurality of modules comprises instructions executable by the processor to:
      display a security access interface on the touch sensitive display, wherein the security access interface has at least one polyhedron object rotatable and movable in a virtual three-dimensional space, the at least one polyhedron object comprising static parameters and dynamic parameters, the static parameters being unchangeable, and the dynamic parameters being changeable by rotating, moving and repositioning the polyhedron object, wherein locations of every two polyhedron objects are exchangeable if there are more than one polyhedron object, the static parameters comprise at least: a number of the at least one polyhedron object of the security access interface, a color of the at least one polyhedron objects, and a number of faces of each of the at least one polyhedron objects, and the dynamic parameters comprise at least: rotated angle, rotated direction, moved displacement, and rearranged sequence of the at least one polyhedron object if there are more than one polyhedron object;
      change the at least one polyhedron object from a first state to a second state according to detections of inputs/contacts with the touch sensitive display;
      record the static parameters and dynamic parameters of the at least one polyhedron object in the second state;
      determine if the recorded parameters satisfy the predetermined values; and
      grant access when the record parameters satisfy the predetermined values.

2. A method for granting access with a touch sensitive display and a memory, the method comprising:
   displaying a security access interface on the touch sensitive display, wherein the security access interface has at least one polyhedron object rotatable and movable in a virtual three-dimensional space, the at least one polyhedron object comprising static parameters and dynamic parameters, the static parameters being unchangeable, and the dynamic parameters being changeable by rotating, moving and repositioning the polyhedron object, wherein locations of every two polyhedron objects are exchangeable if there are more than one polyhedron object, the dynamic parameters comprise at least: rotated angle, rotated direction, moved displacement, and rearranged sequence of the at least one polyhedron object if there are more than one polyhedron object;

changing the at least one polyhedron object from a first state to a second state according to detections of inputs/contacts with the touch sensitive display;

recording static parameters and dynamic parameters of the at least one polyhedron object in the second state;

determining if the recorded parameters satisfy predetermined values stored in the memory; and granting access when the record parameters satisfy the predetermined values.

* * * * *